US011194504B2

(12) United States Patent
Matsubara et al.

(10) Patent No.: US 11,194,504 B2
(45) Date of Patent: Dec. 7, 2021

(54) INFORMATION PROCESSING DEVICE AND DATA MANAGEMENT METHOD OF INFORMATION PROCESSING DEVICE (71) Applicant: HITACHI, LTD., Tokyo (JP)

(72) Inventors: Kazumasa Matsubara, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 45 days.

(21) Appl. No.: 16/842,387

(22) Filed: Apr. 7, 2020

(65) Prior Publication Data
US 2020/0319817 A1 Oct. 8, 2020

(30) Foreign Application Priority Data

Apr. 8, 2019 (JP) .............................. JP2019-073622

(51) Int. Cl.
*G06F 3/06* (2006.01)

(52) U.S. Cl.
CPC ............ *G06F 3/0653* (2013.01); *G06F 3/067* (2013.01); *G06F 3/0619* (2013.01); *G06F 3/0652* (2013.01); *G06F 3/0659* (2013.01)

(58) Field of Classification Search
CPC ...... G06F 3/0653; G06F 3/0652; G06F 3/067; G06F 3/0619; G06F 3/0659; G06F 3/0608; G06F 3/0611
See application file for complete search history.

(56) References Cited

U.S. PATENT DOCUMENTS

| 6,134,643 A * | 10/2000 | Kedem ............... G06F 12/0862 711/137 |
| 6,934,720 B1 * | 8/2005 | Jacobs ................ G06F 16/9574 |
| 7,565,494 B1 * | 7/2009 | Todd ................... G06F 12/0862 709/221 |
| 10,176,103 B1 * | 1/2019 | Chatterjee ........... G06F 11/1076 |
| 2005/0114606 A1 * | 5/2005 | Matick ................. G06F 12/127 711/134 |
| 2013/0339625 A1 * | 12/2013 | Prasky ................ G06F 12/0862 711/137 |
| 2015/0033057 A1 * | 1/2015 | Maroney ............. G06F 12/0866 713/324 |
| 2016/0080442 A1 | 3/2016 | Justice et al. |

(Continued)

FOREIGN PATENT DOCUMENTS

| JP | 2017-072982 A | 4/2017 |
| JP | 2017-536143 A | 12/2017 |

*Primary Examiner* — Hiep T Nguyen
(74) *Attorney, Agent, or Firm* — Volpe Koenig (57) ABSTRACT Efficient pre-reading is performed in data transmission and reception between an Edge node and a Core node. An information processing device includes a storage device, outputs client request data based on a request of a client, and stores predetermined pre-read data in the storage device before the request of the client. The device includes: a relevance calculation module configured to calculate relevance between data based on an access history of the data; and a pre-reading and deletion module configured to determine data to be deleted from the storage device using the relevance when data having predetermined relevance with the client request data is to be stored to the storage device as the pre-read data and a storage capacity of the storage device is insufficient if at least one of the client request data and the pre-read data is to be stored to the storage device.

13 Claims, 9 Drawing Sheets

(56) References Cited

U.S. PATENT DOCUMENTS

2016/0223332 A1* 8/2016 Chesnutt ................ G01C 21/20
2016/0321287 A1* 11/2016 Luthra ...................... G06F 9/46
2016/0381176 A1* 12/2016 Cherubini .............. G06N 7/005
709/219
2017/0103024 A1 4/2017 Matsuo

* cited by examiner

| FILE NAME | LAST ACCESS DATE AND TIME | VIRTUAL FILE | ACTUAL FILE SIZE |
|---|---|---|---|
| FileA | 2019/1/1 20:00:00 | VIRTUAL | 50MB |
| FileB | 2019/1/1 16:00:00 | VIRTUAL | 50MB |
| FileC | 2019/1/1 14:00:00 | VIRTUAL | 50MB |
| FileD | 2019/1/1 12:00:00 | ACTUAL | 50MB |
| FileE | 2019/1/1 18:00:00 | ACTUAL | 50MB |
| File1 | 2019/1/1 14:00:00 | VIRTUAL | 50MB |
| File2 | 2019/1/1 12:00:00 | VIRTUAL | 50MB |
| File3 | 2019/1/1 18:00:00 | VIRTUAL | 50MB |
| ⋮ | ⋮ | ⋮ | ⋮ |

| key | value | |
|---|---|---|
| BANDWIDTH | 100[MB/sec] | 501 |
| PRE-READ FILE OBTAINING TIME | 1[sec] | 502 |
| FREE CAPACITY | 50[MB] | 503 |
| RELATED FILE THRESHOLD | 10[sec] | 504 |

| FILE NAME | RELATED FILE 1 | | | RELATED FILE 2 | | | ... |
|---|---|---|---|---|---|---|---|
| | FILE NAME | RELEVANCE | ACCESS FREQUENCY | FILE NAME | RELEVANCE | ACCESS FREQUENCY | |
| FileA | FileB | 70% | 10 TIMES | - | - | - | ... |
| FileB | FileC | 40% | 20 TIMES | - | - | - | ... |
| FileC | FileD | 40% | 30 TIMES | - | - | - | ... |
| FileD | FileE | 40% | 40 TIMES | - | - | - | ... |
| FileE | - | - | - | - | - | - | |
| File1 | File2 | 60% | 100 TIMES | File3 | 20% | 1 TIME | ... |
| File2 | File4 | 80% | 10 TIMES | - | - | - | ... |
| File3 | File5 | 60% | 20 TIMES | - | - | - | ... |
| ⋮ | ⋮ | ⋮ | ⋮ | ⋮ | ⋮ | ⋮ | ⋮ |

| # | FILE NAME | ACCESS TIME | USER NAME | HOST NAME |
|---|---|---|---|---|
| 1 | FileA | 2019/1/1 12:00:00 | UA | HA |
| 2 | FileB | 2019/1/1 12:00:05 | UB | HB |
| 3 | FileC | 2019/1/1 12:00:10 | UA | HA |
| 4 | FileD | 2019/1/1 12:00:20 | UX | HA |
| 5 | FileE | 2019/1/1 12:00:40 | UB | HB |
| 6 | File1 | 2019/1/1 12:00:45 | UC | HC |
| 7 | File2 | 2019/1/1 12:00:50 | UD | HD |
| 8 | File3 | 2019/1/1 12:00:55 | UC | HC |
| ⋮ | ⋮ | ⋮ | ⋮ | ⋮ |

Columns: 601, 602, 603, 604, 605

| PRE-READING SCHEDULED FILE NAME | RELATED STAGE NUMBER | RELEVANCE | VIRTUAL FILE | ACTUAL FILE SIZE | EXTRACTION RELATED FILE (PRIORITY) |
|---|---|---|---|---|---|
| FileA | 0 | 100% | ACTUAL | 50MB | - |
| FileB | 1 | 70% | VIRTUAL | 50MB | o(1) |
| FileC | 2 | 28% | VIRTUAL | 50MB | o(2) |
| FileD | 3 | 11.2% | ACTUAL | 50MB | x |
| FileE | 4 | 4.5% | ACTUAL | 50MB | x |
| TOTAL SIZE OF PRE-READING SCHEDULED FILES | | | | 100MB | |
| TOTAL CAPACITY OF RELATED FILES | | | | 100MB | |

Columns: 701, 702, 703, 704, 705, 706

| DELETION SCHEDULED FILE NAME (801) | VIRTUAL FILE (802) | ACTUAL FILE SIZE (803) | EXTRACTION RELATED FILE (PRIORITY) (804) | DELETION (VIRTUALIZATION) OR PRE-READING CANCELLATION TARGET (805) |
|---|---|---|---|---|
| FileD | ACTUAL | 50MB | x | o |
| FileE | ACTUAL | 50MB | x | o |
| TOTAL SIZE OF DELETION SCHEDULED FILES | | 100MB | | |
| TARGET DELETION CAPACITY | | 100MB | | |

INFORMATION PROCESSING DEVICE AND DATA MANAGEMENT METHOD OF INFORMATION PROCESSING DEVICE

BACKGROUND OF THE INVENTION

1. Field of the Invention

The present invention relates to a technique for speeding up a response to a data request from a client in an operation of a storage system based on Edge/Core cooperation using a data virtualization technique.

2. Description of the Related Art

Currently, with an explosive increase of IoT data, demand for Edge computing is increasing. Generally, a storage capacity of a data store on an Edge side is often small. At this time, in order to cope with an explosive data amount, an operation of storage based on Edge/Core cooperation using a data virtualization technique is required.

In recent years, a technique for pre-reading a file related to an access target file and speeding up data reading has been used. In the Edge/Core cooperation, in order to read data that does not exist in an Edge node, it is necessary to read the data from a Core node to the Edge node. At this time, by pre-reading the data related to the read data, it is possible to immediately respond to a request from a client. However, since a capacity of the Edge node is limited and all files cannot be managed by the Edge node, it is necessary to select data of the Edge node. Therefore, a technique of selecting data to be pre-read and deleting data in a predetermined time is used.

For example, Patent Literature 1 (JP-T-2017-536143) discloses that an edge computing infrastructure facilitates intelligent streaming because a pre-reading command is associated with a game asset classified as a pre-read game asset or a stream game asset.

Further, Patent Literature 2 (JP-A-2017-072982) discloses a technique of monitoring access to data blocks pre-read into a memory based on stream information, determining a stop of a stream based on an elapsed time since any of the data blocks was last accessed, and deleting at least a part of the data blocks from the memory if it is determined that the stream has stopped.

Since a capacity of data that can be stored in an Edge node is limited, it is necessary to delete data that the client does not need to secure a free capacity.

In a case of deleting the pre-read data in the Edge node, for example, in the technique of Patent Literature 2, the data is deleted when there is no access to a pre-read page for a predetermined time. Therefore, even data that may be requested by the client in the future may be deleted. When such data is deleted, it is necessary to read the data from the Core node again when the client requests the data after the data is deleted.

Therefore, efficient pre-reading cannot be performed in data transmission and reception between the Edge node and the Core node.

SUMMARY OF THE INVENTION

One aspect of the invention is an information processing device that includes a storage device, outputs client request data based on a request of a client, and stores predetermined pre-read data in the storage device before the request of the client. The device includes: a relevance calculation module configured to calculate relevance between data based on an access history of the data; and a pre-reading and deletion module configured to determine data to be deleted from the storage device using the relevance when data having predetermined relevance with the client request data is to be stored to the storage device as the pre-read data and a storage capacity of the storage device is insufficient if at least one of the client request data and the pre-read data is to be stored to the storage device.

Another aspect of the invention is a data management method of an information processing device that provides client request data to a client based on a request of the client. In the method, relevance between data calculated based on an access history of the data is used. Further, the method includes: a first step of checking whether the client request data exists in a first storage device in response to the request of the client; a second step of obtaining the client request data from a second storage device and storing the client request data to the first storage device when the client request data does not exist in the first storage device; a third step of extracting pre-read data having predetermined relevance with the client request data in response to the request of the client; a fourth step of obtaining the pre-read data from the second storage device and storing the pre-read data to the first storage device; a fifth step of determining data to be deleted from the first storage device using the relevance when a storage capacity of the first storage device is insufficient if at least one of the client request data and the pre-read data is to be stored to the first storage device.

Efficient pre-reading can be performed in data transmission and reception between the Edge node and the Core node. Further specific objects, configurations, and effects of the invention will be clarified in description of examples.

DESCRIPTION OF THE PREFERRED EMBODIMENTS

Embodiments will be described in detail with reference to the drawings. However, the invention should not be construed as being limited to description of the embodiments to be described below. Those skilled in the art could have easily understood that specific configurations can be changed without departing from the spirit or gist of the invention.

In the configurations of the invention to be described below, the same part or a part having similar functions are denoted by same reference numerals in common among the different drawings, and a repetitive description thereof may be omitted.

When there are a plurality of elements having the same or similar functions, the same reference numerals may be given with different subscripts. However, when there is no need to distinguish the plurality of elements, the subscripts may be omitted.

The terms "first", "second", "third", or the like in the present specification are used to identify components, and do not necessarily limit the number, the order, or the contents thereof. Further, numbers for identification of the components may be used for each context, and the number used in one context may not necessarily indicate the same configuration in other contexts. In addition, the component identified by a certain number does not interfere with the function of a component identified by another number.

In order to facilitate understanding of the invention, a position, a size, a shape, a range, or the like of each configuration shown in the drawings may not represent an actual position, size, shape, range, or the like. Therefore, the invention is not necessarily limited to the position, the size, the shape, the range, or the like disclosed in the drawings.

When data is pre-read to an Edge node, it is necessary to delete data corresponding to a data obtaining capacity when it is assumed that a capacity is insufficient if new data is obtained. Further, when there is a charge due to use of a band, it is desirable that data stored by the Edge node is basically kept, and the use of the band due to data transmission and reception between the Edge node and the Core node is controlled.

In the technique of Patent Literature 2 regarding deletion of data, the data is deleted from one with the lowest access frequency. Therefore, pre-reading scheduled data or data immediately after pre-reading may be determined to have a low access frequency, and a pre-reading effect may not be obtained. Further, when the deleted data is re-read, the data transmission and reception between the Edge node and the Core node increases.

In an example of a data pre-reading and deletion (virtualization) method in consideration of association to be described below, data to be pre-read is determined using related information indicating association between data. The data obtained in the Edge node is not basically deleted, but when client request data or related data thereof is obtained from the Core node, the data is deleted (virtualized) when a capacity is insufficient. At this time, data to be deleted is also determined using the related information indicating the association between the data. The data to be deleted is insufficient amount corresponding to the capacity of the data to be pre-read.

Accordingly, even if the pre-read data is not accessed over a predetermined time, the data is not deleted. Therefore, it is possible to perform optimal pre-reading in minimum data transmission and reception between the Edge node and the Core node, and it is possible to reduce a load on the Edge node and the Core node, reduce usage fee of the band, and speed up data obtaining of a client. Further, the capacity of the data to be pre-read is determined in consideration of a band of a network and a time available for pre-reading.

An embodiment of the invention will be described with reference to FIGS. 1 to 10. The embodiment is an example of a storage system including a Core node that manages a file/object and an Edge node that virtualizes the file/object and obtains and deletes (virtualizes) the file/object from the Core node in response to a request of a client.

The present embodiment shows, (1) processing in which the Edge node receives the request from the client and the file/object is pre-read using relevance of file/object information, and (2) processing of determining and deleting the file/object to be deleted (virtualized) using the relevance of the file/object information when it is assumed that the capacity is insufficient at the time of pre-reading, in order to secure the insufficient amount of the capacity.

Figure 1:
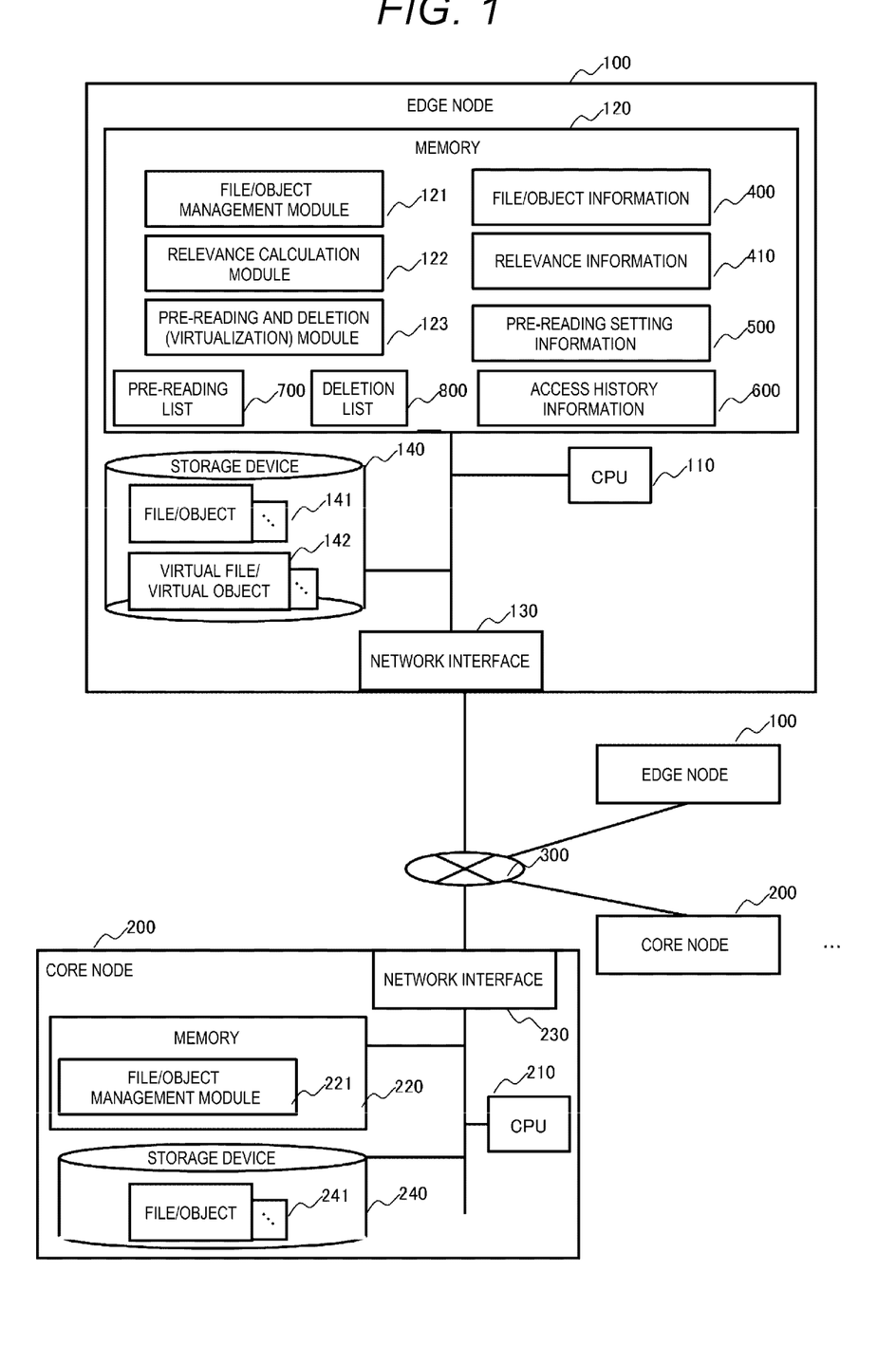
FIG. 1 is a block diagram showing a configuration example of an embodiment.

FIG. 1 is a configuration example of a data pre-reading and deletion (virtualization) system in the embodiment in which association between an Edge node 100 and a Core node 200 is considered. A client (not shown) is connected to the Edge node 100, and a file can be obtained from the Edge node 100. In the present specification or the like, terms of data and file are used synonymously unless otherwise specified.

<1. Edge Node>

The Edge node 100 includes a CPU 110, a memory 120, a network interface 130, and a storage device 140. Further, there may be a plurality of the Edge nodes.

The CPU 110 performs a program stored in the memory 120.

The memory 120 includes a file/object management module 121, a relevance calculation module 122, and a pre-reading and deletion (virtualization) module 123, and stores file/object information 400, relevance information 410, pre-reading setting information 500, access history information 600, a pre-reading list 700, and a deletion list 800.

The file/object management module 121 manages a file/object of the storage device 140 and updates the file/object information 400. Further, obtaining of data from other nodes and management of a capacity of the data is performed.

The relevance calculation module 122 updates relevance of the relevance information 410 by using the access history information 600 and the pre-reading setting information 500 and using a relevance calculation algorithm.

The pre-reading and deletion (virtualization) module 123 determines and obtains a file/object related to a file/object requested to be obtained by a client by using the relevance of the relevance information 410. Further, during obtaining of the file/object, when it is assumed that a capacity is insufficient, a file to be deleted (virtualized) is determined by using the relevance of the relevance information 410.

The file/object information 400 stores information of the file/object, information of a virtual file/virtual object, and related information of various data stored in the storage device 140.

The pre-reading setting information 500 stores information (bandwidth, free capacity, or the like) necessary for calculation of the relevance and pre-reading and deletion (virtualization).

The access history information 600 stores log information such as a time point when the request of obtaining the file/object is received from the client.

The pre-reading list 700 stores a list of candidates for a pre-read file generated when the pre-read file is determined.

The deletion list 800 stores a list of candidates to be deleted (virtualized) in order to solve insufficiency of the free capacity when all the pre-read files are obtained and the free capacity is insufficient.

The network interface 130 is connected to an external network and transmits/receives data to/from other nodes and clients.

The storage device 140 stores files/objects entities (actual data) 141 and files/object virtual information (virtual data) 142. Further, metadata such as the file/object information 400 may be managed by the storage device 140.

In the present embodiment, functions such as calculation and control are implemented by performing the program stored in the memory 120 by the CPU 110 in cooperation with other hardware in predetermined processing. A program to be performed by a computer or the like, a function thereof, or means for implementing the function may be referred to as a "function", "means", a "portion", a "unit", a "module", or the like.

A configuration of the Edge node described above may be configured by a single computer, or any part of an input device, an output device, a processing device, and a storage device may be configured by another computer connected via a network.

In the present embodiment, functions equivalent to functions implemented by software can also be implemented by hardware such as a Field Programmable Gate Array (FPGA) and an Application Specific Integrated Circuit (ASIC).

<2. Core Node>

The Core node 200 includes a CPU 210, a memory 220, a network interface 230, and a storage device 240. Further, there may be a plurality of the Core nodes. The Core node manages the actual data, and a part of the actual data is transmitted and stored to the Edge node in response to a request from the Edge node 100.

The CPU 210 performs a program stored in the memory 220. The memory 220 includes a file/object management module 221.

The file/object management module 221 stores a capacity of the data of the file/object, a position on the storage device 240, or the like, and enables data input and output.

The network interface 230 is connected to the external network and transmits/receives data to/from other nodes.

The storage device 240 stores files/object actual states (actual data) 241. Further, even in a case of the Core node, actual data of another Core node may be stored as virtual data. At this time, the file/object management module 221 also manages the virtual data.

<3. File/Object Information>

Figure 2:
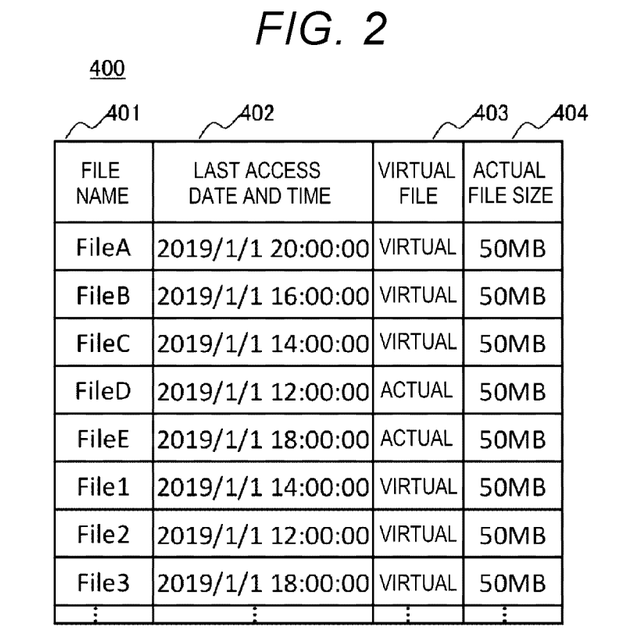
FIG. 2 is a table showing file/object information according to the embodiment.

FIG. 2 shows an example of the file/object information 400. The file/object information 400 is used by the file/object management module 121, the relevance calculation module 122, and the pre-reading and deletion (virtualization) module 123 of the Edge node 100.

The file/object information 400 stores a file name 401, a last access date and time 402, a virtual file flag 403, and an actual file size 404. The file/object information 400 is generated and updated by the file/object management module 121. The last access date and time 402 and the virtual file flag 403 are preferably updated in real-time.

The file name 401 stores file names of the file/object 141 and the virtual file/virtual object 142 stored in the storage device 140. The last access date and time 402 stores a last access date and time when the client requests the file name 401. The virtual file flag 403 indicates whether the data is stored in the storage device 140 as actual data or virtual data. The actual file size 404 indicates an actual data size of the actual data or the virtual data stored in the storage device 140.

<4. Pre-reading Setting Information>

Figure 3:
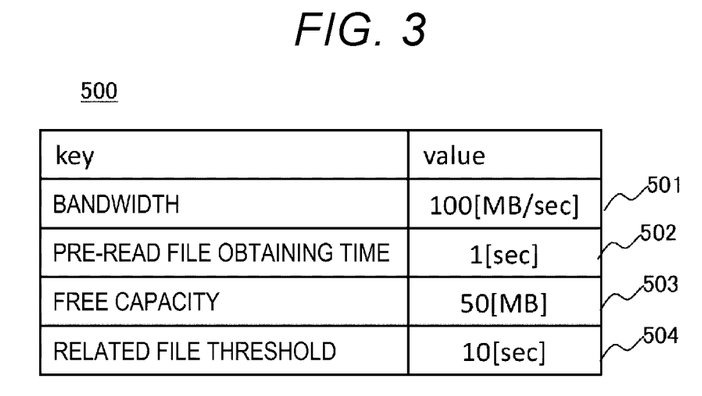
FIG. 3 is a table showing pre-reading setting information according to the embodiment.

FIG. 3 shows an example of pre-reading setting information 500. The pre-reading setting information 500 is used by the relevance calculation module 122 and the pre-reading and deletion (virtualization) module 123 of the Edge node 100. The pre-reading setting information 500 is basically set and updated by a user (operator), but parameters to be changed dynamically may be changed automatically by a system.

The pre-reading setting information 500 includes a bandwidth 501, a pre-read file obtaining time 502, a free capacity 503, and a related file threshold 504.

The bandwidth 501 indicates an internode bandwidth between the Edge node 100 and the Core node 200. When there are a plurality of Core nodes 200, the bandwidth between the Edge node and each Core node is respectively stored in association with information for identifying each Core node. The bandwidth is set in advance by the user or measured by the network interface 130 with a known measurement method. The bandwidth may be updated at any time interval when the bandwidth varies with time, and may be a constant value.

The pre-read file obtaining time 502 is optionally determined, and indicates information to be used by multiplying by the bandwidth 501 during determination of a capacity of a pre-read file. Since the capacity of the file that can be pre-read is determined by the bandwidth and the pre-read file obtaining time 502, the user sets an appropriate file obtaining time according to the use and performance of the system.

The free capacity 503 indicates free capacity information of the storage device 140 of the Edge node 100. The free capacity is updated in accordance with storage and deletion of the pre-read file in the storage device 140.

The related file threshold 504 indicates a threshold for determining whether files that are consecutively accessed are related when the relevance calculation module 122 calculates the relevance. The threshold may be set optionally. In the example of FIG. 3, two files that have been accessed consecutively within 10 seconds are defined as related files. Further, information defining a function for calculating the relevance may be stored in place of the threshold.

<5. Relevance Information>

Figure 4:
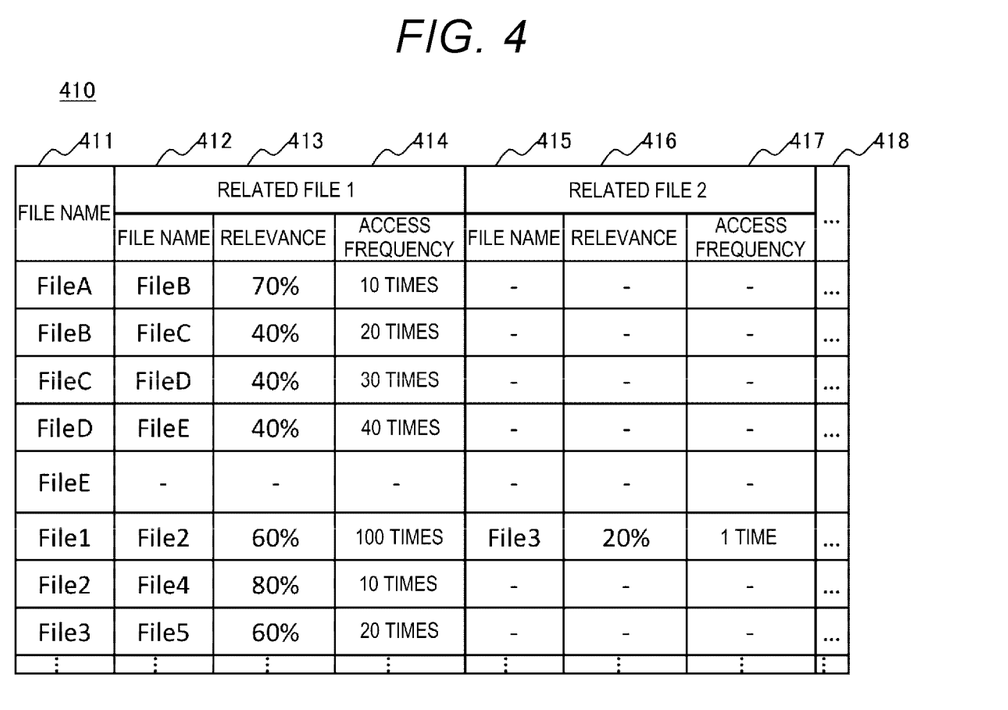
FIG. 4 is a table showing relevance information according to the embodiment.

FIG. 4 shows an example of the relevance information 410. The relevance information 410 is used by the relevance calculation module 122 and the pre-reading and deletion (virtualization) module 123 of the Edge node 100. The relevance information 410 is generated and updated by the relevance calculation module 122 based on the pre-reading setting information 500 and the access history information 600. The generation and the update are performed, for example, when a file is accessed, and may be batch-processed periodically.

The relevance information 410 includes a file name 411 of a relation source, a file name 412 of a related file 1, relevance 413 of the related file 1, an access frequency 414 of the related file 1, a file name 415 of a related file 2, relevance 416 of the related file 2, relevance 417 of a related file 3, and related file information 418 thereafter.

When there are a plurality of files related to a file having the file name 411, information such as the related file 1, the related file 2, or the like is stored.

The relevance is determined based on a time interval (seconds) of access between the two files by using the related file threshold (or function) 504 of the pre-reading setting information 500 and the access history information 600. For example, an access interval (seconds) between a file having the file name 411 and a file having the related file name 412 is compared with the related file threshold 504, when the access interval exceeds the threshold, the relevance is set to 0%, if data is obtained after 0 second, the relevance is set to 100%, and the relevance is calculated as a linear relationship between the access interval and the relevance. Alternatively, as in a sigmoid function, the relevance may be calculated using the threshold as an inflection point and a horizontal axis as a difference time (access interval). For example, a function such as the following function is used:

$$f(t)=1-(-1)/(1+\exp(-g(t/i-1)))$$

wherein, f(t): relevance, t: difference time, g: slope in graph of function, i: inflection point in graph of function.

In general, the function f(t) representing the relevance is a monotonically decreasing function in which the f(t) decreases as the t increases, and a function may be used in which f(t)=0 when a predetermined t (related file threshold 504) is exceeded.

The access frequency is determined using the access history information 600. For example, when access is made 100 times in an order of a File 1 to a File 2 within a predetermined period in an access history, the access frequency is set to 100.

As an example, the relevance calculation module 122 calculates the relevance for each access of the access frequency 414, and calculates an average value as the relevance 413. For example, the relevance of 70% between a File A and a File B in FIG. 4 is an average value of the relevance calculated for each of 10 times access.

When the access frequency is small and the number of samples is small, reliability of the relevance may be determined to be low and the relevance may not be used. For example, the access frequency is set to three times as a threshold, and the relevance of 20% between the File 1 and a File 3 in FIG. 4 may be regarded as having a low reliability, so that the relevance is not calculated or invalidated.

<6. Access History Information>

Figure 5:
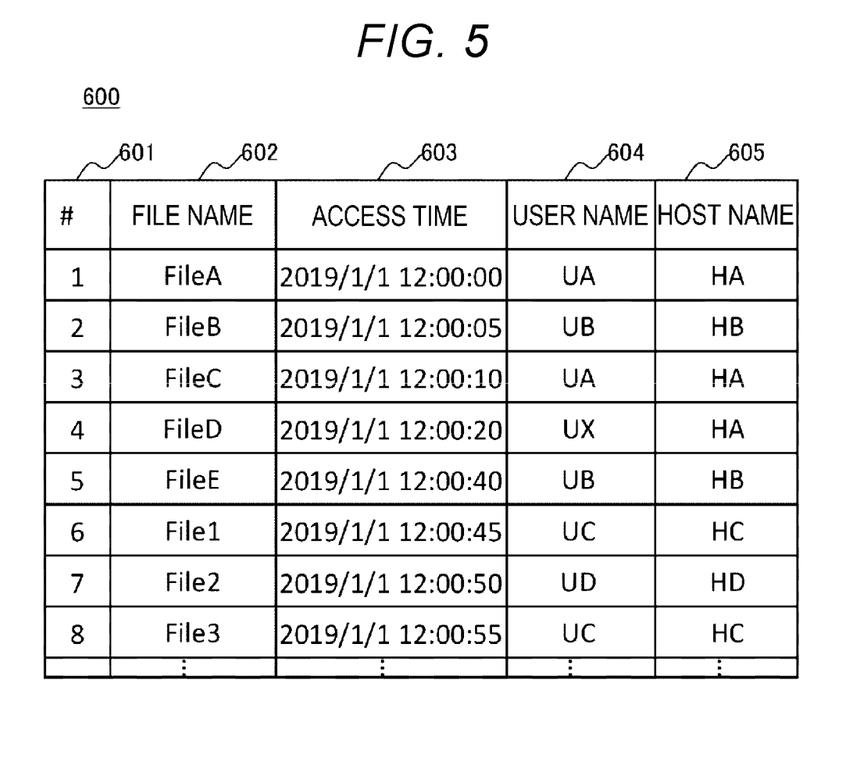
FIG. 5 is a table showing an access history according to the embodiment.

FIG. 5 shows an example of the access history information 600 used by the relevance calculation module 122 of the Edge node 100 to update the relevance of the relevance information 410. The access history information 600 may use access history information recorded by a general node. The access history information 600 includes a file name 602, an access time 603, a user name 604, and a host name 605.

The file name 602 indicates a file name accessed by the client. The access time 603 indicates a time when the client accesses. The user name 604 indicates a user name of the client. The host name 605 indicates a host name (IP address) of an access source.

A table of the relevance information 410 in FIG. 4 may be generated for each Edge node 100 based on the access history information 600 in FIG. 5. However, the table can be calculated separately for each user (client), each host (Core node IP address), or each combination of the user and the host, and generated as a separate table. For example, pre-reading processing for a certain client is performed based on the relevance information calculated based on the access history of the client. In this way, it is possible to reflect the characteristics of the user and the host on the relevance.

<7. Pre-Reading List>

Figure 6:
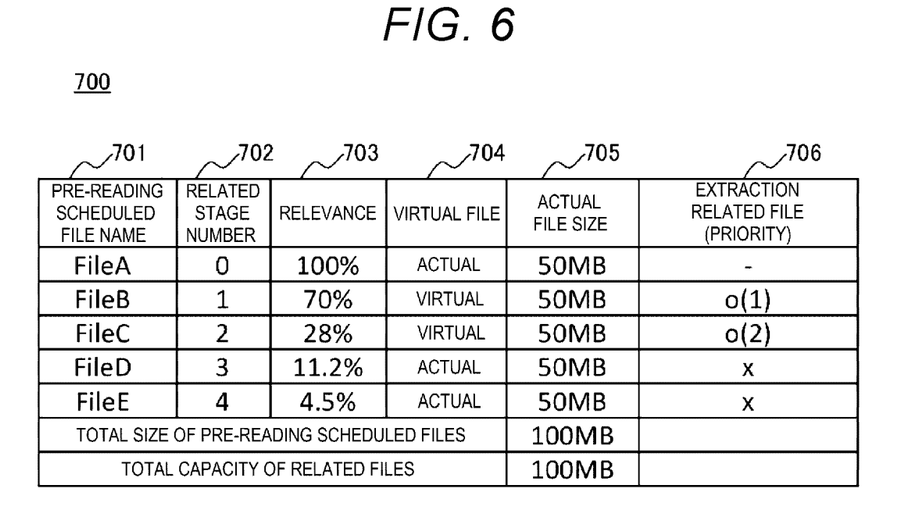
FIG. 6 is a table showing a pre-reading list according to the embodiment.

FIG. 6 shows a pre-reading list 700 used by the pre-reading and deletion (virtualization) module 123 of the Edge node 100. The pre-reading list 700 stores a pre-reading scheduled file name 701, a related stage number 702, relevance 703, a virtual file flag 704, an actual file size 705, and extraction related file 706.

The pre-reading list 700 is generated by the pre-reading and deletion (virtualization) module 123 when, for example, the client requests a file from the Edge node 100. The pre-reading and deletion (virtualization) module 123 pre-reads or deletes a file based on the generated pre-reading list 700. After the processing is completed, the generated pre-reading list 700 may be discarded.

The pre-reading scheduled file name 701 indicates a related file name extracted by the pre-reading and deletion (virtualization) module 123 for a file requested by the client. At the time of extraction, the pre-reading and deletion (virtualization) module 123 extracts a file related to the file requested by the client by referring to the relevance information 410.

The related stage number 702 indicates a distance from the file requested by the client, with the file requested by the client as a zero stage, a related file as a first stage, and a file related to the file at the first stage as a second stage.

The relevance 703 indicates a value obtained by combining the relevance of the relation source (the file requested by the client is assumed to be 100%) and the relevance of the relevance information 410. The combining method differs depending on an algorithm of calculation of the relevance. For example, for the related file at the first stage, the relevance of the relevance information 410 is directly used, and for the related file at the second or subsequent stage, a product of the relevance of the passed file and the own relevance is set as the relevance 703.

The virtual file flag 704 indicates whether a file of the pre-reading scheduled file name 701 is stored in the storage device 140 as virtual data or as actual data.

The actual file size 705 indicates a size of the actual data of the pre-reading scheduled file name 701.

The extraction related file 706 indicates, in a file related to a client request file, a flag for distinguishing a pre-reading scheduled file and a file not to be pre-read, and a priority order for pre-reading.

In an example of FIG. 6, the file requested by the client is the File A, and the relevance is 100%. When the File A is a virtual file, the File A is obtained from the Core node 200 as an actual file and stored as the file/object 141 of the storage device 140 of the Edge node 100. Based on the relevance information 410 in FIG. 4, Files B, C, D, and E are listed in the pre-reading list 700, and the relevance 703 is calculated. The Files B and C are virtual files having higher relevance. Capacities of the Files B and C are 100 MB in total, and are pre-readable capacities ((100 MB/sec)×1 sec) based on the bandwidth 501 and the pre-read file obtaining time 502 of the pre-reading setting information 500 in FIG. 3.

In the File B and the File C, the File B has higher relevance and has a higher pre-reading priority than the File C. Therefore, a flag indicating the pre-reading priority (priority order) is stored in the extraction related file 706. Further, the Files D and E are files having lower relevance and overflow from the pre-readable capacity. Therefore, when the Files D and E are virtual files, the files are excluded from pre-read candidates. Further, when the Files D and E are actual files, the files are deletion candidates. The flag indicating the pre-reading priority is stored as the extraction related file 706.

<8. Deletion (Virtualization) List>

Figure 7:
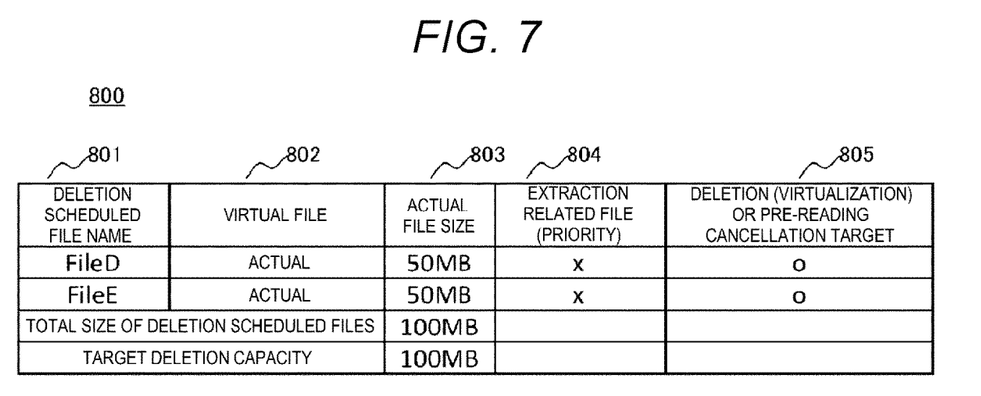
FIG. 7 is a table showing a deletion (virtualization) list according to the embodiment.

FIG. 7 shows a deletion (virtualization) list 800 used by the pre-reading and deletion (virtualization) module 123 of the Edge node 100. The deletion (virtualization) list 800 stores a deletion (virtualization) scheduled file name 801, a virtual file flag 802, an actual file size 803, an extraction related file 804, and a deletion (virtualization) or pre-reading cancellation target 805. The deletion (virtualization) list 800 is generated by the pre-reading and deletion (virtualization) module 123 after the pre-reading scheduled file name 701 is generated.

The deletion (virtualization) scheduled file name 801 indicates a file name of a candidate to be deleted (virtualized). The virtual file flag 802 indicates whether the deletion (virtualization) scheduled file name 801 is actual data or virtual data. The actual file size 803 indicates a size of the actual data of the deletion (virtualization) scheduled file name 801.

When the extraction related file 804 is also listed in the extraction related file 706 of the pre-reading list 700 at the time of pre-reading, the extraction related file 804 indicates the same value as the extraction related file 706. When the extraction related file 804 is listed as a pre-reading target in the pre-reading list 700, the priority of deletion is lowered. When the capacity cannot be secured without deletion (virtualization), one with the highest priority in the deletion (virtualization) list 800 is used as a deletion (virtualization) candidate.

The deletion (virtualization) or pre-reading cancellation target 805 stores a flag indicating a target file to be deleted to secure the capacity among the file names listed in the deletion (virtualization) scheduled file name 801.

In an example of FIG. 7, based on the file/object information 400 in FIG. 2, the File D, which is an actual file with the oldest access other than the client request file, is extracted. Further, based on the relevance information 410 in FIG. 4, a related file of the File D is extracted, and the File E which is an actual file is extracted.

In the examples of FIGS. 6 and 7, files to be pre-read are the File B and the File C, and files to be deleted are the File D and the File E.

<9. Processing when Receiving File/Object Read Request>

Figure 8:
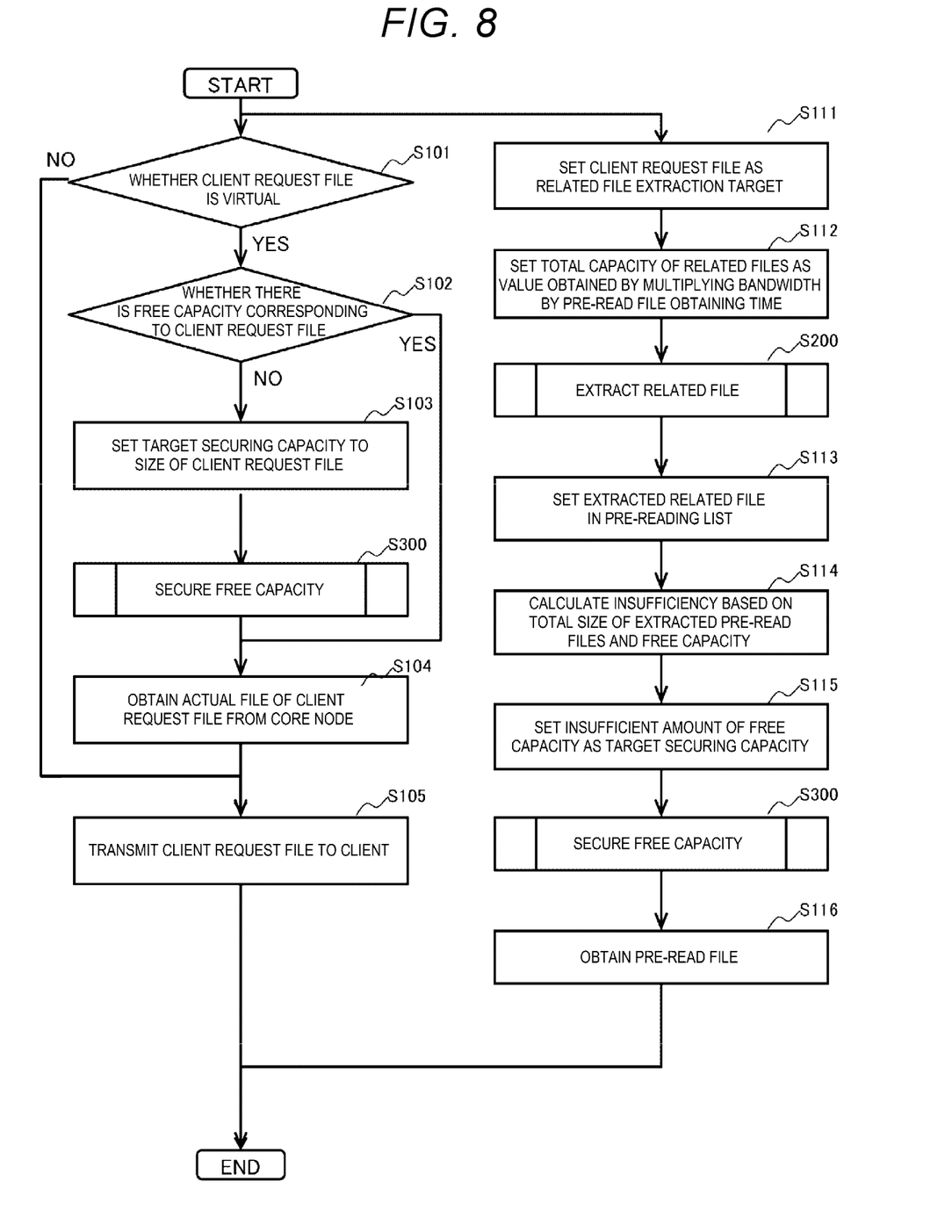
FIG. 8 is a flowchart example of processing of a file/object management module when an Edge node receives a file/object read request from a client according to the embodiment.

FIG. 8 shows a flowchart example of processing in which the Edge node 100 receives a data obtaining request from the client, and obtains and pre-reads data from the Core node 200 based on the file/object information 400, the relevance information 410, and the pre-reading setting information 500 to secure the insufficient amount of the capacity.

The file/object management module 121 receives a data processing request from the client, if the data is virtual, instantiates the data, and starts pre-reading processing.

<9-1. Obtaining of Client Request File>

A response of the client request file (or request data) is performed as follows (S101 to S105, S300).

The file/object management module 121 checks whether the client request file is virtual (that is, whether the client request file is in the storage device 140) based on the file/object information 400 (S101).

If the client request file is virtual, processing of obtaining actual data from the Core node 200 is started. An actual file size of the client request file is checked based on the file/object information 400.

The file/object management module 121 checks whether there is a free capacity corresponding to an actual data size of the client request file in the storage device 140 of the Edge node 100 (S102).

If there is no free capacity corresponding to the actual data size of the client request file, capacity securing processing is started.

A target securing capacity is set to the actual data size of the client request file (S103).

A value of the target securing capacity is transmitted to the pre-reading and deletion (virtualization) module 123 to secure the free capacity. Details will be described in free capacity securing processing of FIG. 10 (S300).

After the free capacity corresponding to actual data of the client request file is secured or when the free capacity already exists, the actual data of the client request file is obtained from the Core node 200 (S104).

If the client request file is not virtual or has been obtained from the Core node 200, the client request file stored in the storage device 140 is transmitted to the client (S105).

<9-2. Pre-Reading Processing>

The pre-reading processing is performed as follows in parallel with the above (S111 to S116, S200, and S300).

The file/object management module 121 sets the client request file as an extraction target (relation source file) of a related file (S111).

The file/object management module 121 obtains the bandwidth 501 and the pre-read file obtaining time 502 from the pre-reading setting information 500, and sets the multiplied value as a total pre-reading capacity (S112).

Information of the total pre-reading capacity and the extraction target (relation source file) is transmitted to the pre-reading and deletion (virtualization) module 123, and the related file is extracted. Details will be described by referring to extraction of the related file in FIG. 9 (S200).

The extracted related file is set in the pre-reading list (S113).

An insufficient amount of the capacity required to obtain the extracted pre-read file is calculated. If the pre-read files are already actual data, the size is 0, and if all are virtual data, the size is the maximum of the total pre-reading capacity (S114).

The target securing capacity is set to a capacity that is a capacity insufficient amount when the pre-read file is obtained (S114).

The value of the target securing capacity is transmitted to the pre-reading and deletion (virtualization) module 123 to secure the free capacity. Details will be described by referring to the free capacity securing processing of FIG. 10 (S300).

The pre-read file is obtained (S116).

<10. Extraction of Related File>

Figure 9:
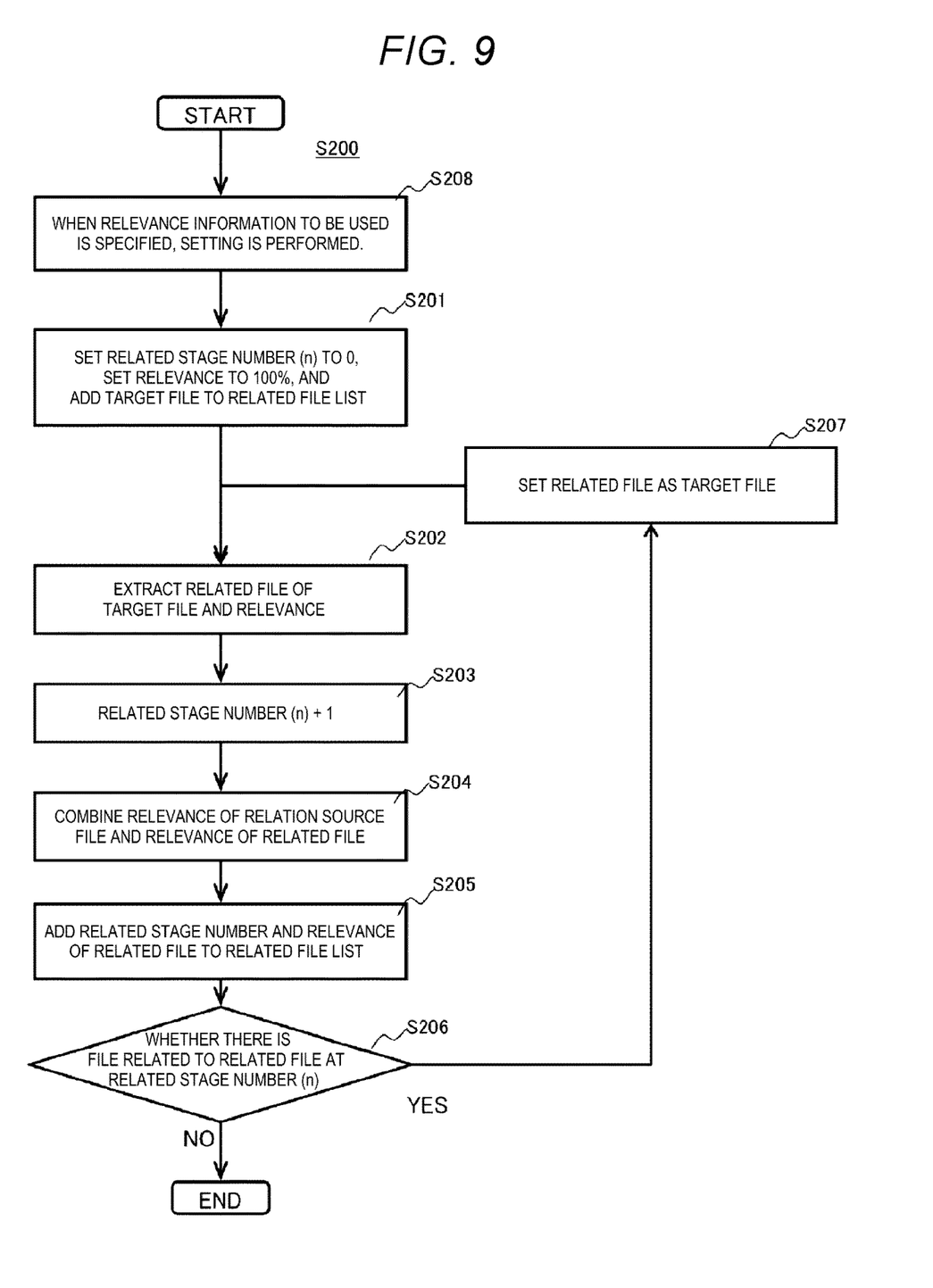
FIG. 9 is a flowchart example of related file extraction processing according to the embodiment.

FIG. 9 shows a flowchart example of the processing S200 in which the pre-reading and deletion (virtualization) module 123 extracts the related file. The processing S200 is used for both extracting a related file to be pre-read and extracting a related file to be deleted (virtualized) from the actual file.

The processing is started when a total capacity of an extraction target file (relation source file) and the related file to be pre-read is set in the pre-reading and deletion (virtualization) module 123. When the related file to be pre-read is to be extracted, an initial extraction target file is the client request file. When the related file to be deleted from the actual file is extracted, the initial extraction target file is a low-access file.

When the file relevance information 410 to be used is specified, setting is performed (S208). For example, relevance information of only a specific user is used.

A related stage number of the extraction target file for extracting the related file is set to 0 and the relevance is set to 100%, and the extraction target file is added to a related file list (S201).

The related file of the extraction target file is extracted using the relevance information 410 (S202).

A related stage number of the related file extracted in S202 is increased by one stage (S203).

Relevance of the relation source file and relevance of the related file in the related file list are combined (S204). The combining method is, for example, combining by multiplying or averaging.

A related stage number of related data and combined relevance are added to the related file list (S205).

It is checked whether all the related files have been investigated (S206).

If not all the related files has been investigated, the processing for the next related stage number is started. Therefore, a current related file is set as the extraction target file, and the processing from S202 is continued (S207).

If all the related files have been investigated, generation of the related file list is completed. Based on the generated related file list, the pre-reading list 700 or the deletion list 800 is set (S113).

In an example of the pre-reading list 700 in FIG. 6, the client request file is the File A, the related stage number is 0, and the relevance is 100%. A related stage number of the File B related to the File A is 1. For example, based on the relevance information 410 in FIG. 4, when relevance between the File A and the File B is 70%, for example, the combined relevance of the File B is 70%, which is a product of the relevance of 100% of the File A and the relevance of 70% of the File B (S204).

A related stage number of the File C related to the File B is 2. For example, based on the relevance information 410 in FIG. 4, when relevance between the File B and the File C is 40%, for example, the combined relevance of the File C is 28%, which is a product of the relevance of 100% of the File A, the relevance of 70% of the File B, and the relevance of 40% of the File C (S204). The subsequent File D and File E can be similarly calculated.

Since the File A is a file requested by the client, the File A is immediately read. Among the related files, File B to File E, since the virtual data is the File B and the File C, the File B and the File C are candidates of the pre-read file.

<11. Securing of Free Capacity>

Figure 10:
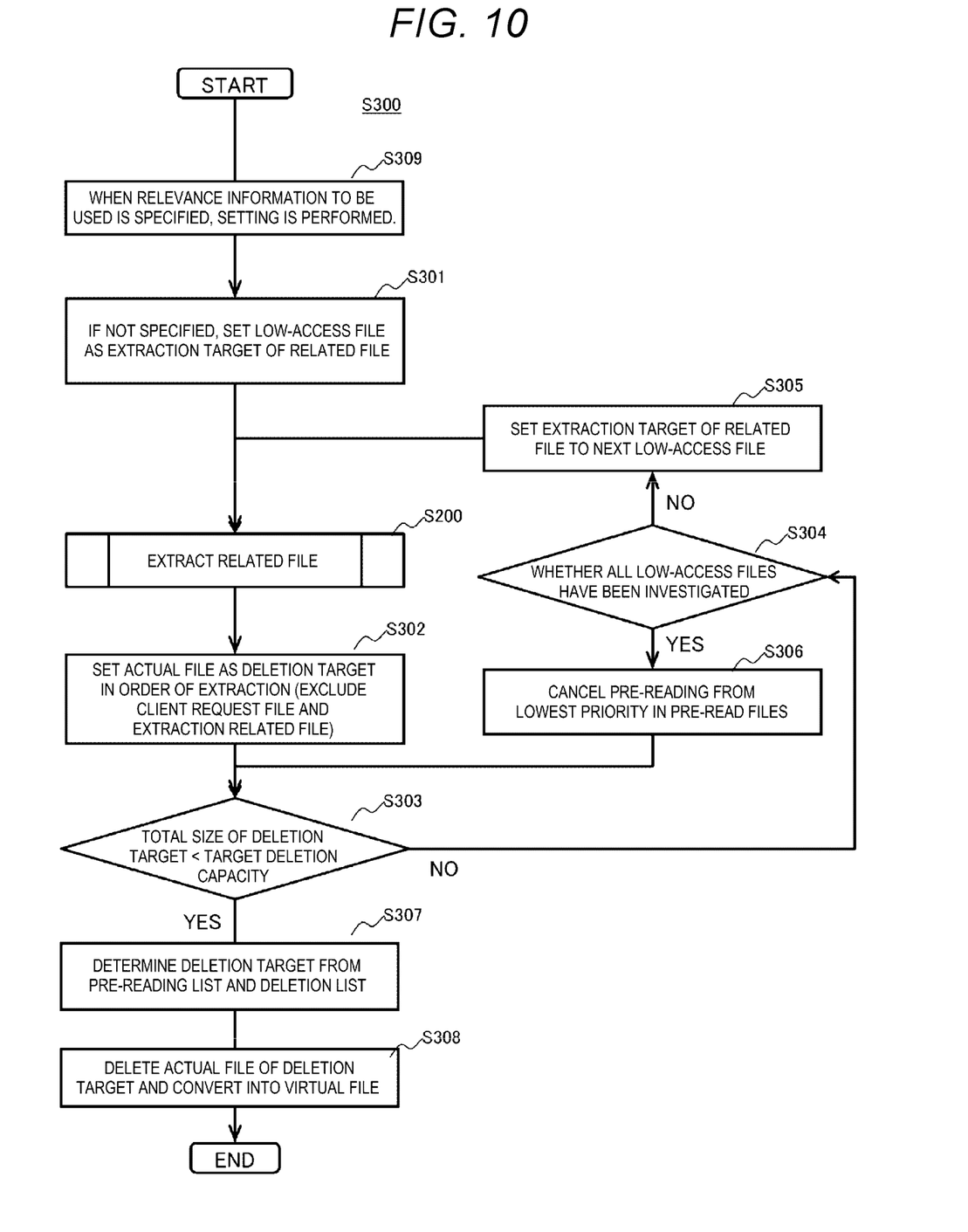
FIG. 10 is a flowchart example of free capacity securing processing according to the embodiment.

FIG. 10 shows a flowchart example of the processing S300 in which the pre-reading and deletion (virtualization) module 123 secures the free capacity.

The processing is started when the target securing capacity is set in the pre-reading and deletion (virtualization) module 123.

When the relevance information 410 to be used (only the specific user or the like) is specified, setting is performed (S309).

When there is no specified extraction target of the related file, a low-access file is set (S301). The low-access file (low-access data) is a file that is not expected to be requested by the client, and is, for example, a file with the lowest number of accesses within a certain period or a file with the oldest access time. The file can be specified by referring to the file/object information 400 and the access history information 600.

Related files of the low-access file are extracted and a related file list is generated (S200). A method of generating the related file list is as described in FIG. 9, but setting of the extraction target of the related file (the file with the related stage number of 0) is different.

The deletion target is set in an order of extraction of related data files. At this time, the client request file is excluded from the deletion targets. Further, when there is a related file scheduled to be pre-read in the pre-reading list 700, a file whose priority as a deletion target is lowered, or a file excluding the related file scheduled to be pre-read is set as a deletion target, and a deletion list is generated (S302).

Further, at this time, among the actual files that have already been pre-read or the like and are stored in the storage device 140, a file having high relevance to a file having a high access frequency or a new access time within a certain period (high-access file) may be excluded from the deletion target.

It is checked whether a deletion target corresponding to a target deletion capacity has been determined (S303). In extraction of the high-access file, an appropriate threshold may be set for the access frequency, the access time, and the relevance described above.

If the deletion target has not been determined, it is checked whether next low-access data exists (S304).

If there is the next low-access data, the next low-access data is set as the extraction target file, the related file is extracted again, and the deletion target is added (S305).

If the deletion target capacity is not reached after checking all the low-access data, pre-reading of data having the lowest priority in the pre-reading scheduled data in the pre-reading list 700 is canceled (S306).

If the target deletion capacity has been reached, a pre-read file and a deletion file are determined based on the pre-reading list 700 and the deletion list 800 (S307).

Actual data of the deletion targets is deleted and converted into virtual data (S308).

In an example of the deletion list 800 in FIG. 7, for example, the File D having the oldest access date and time in the file/object information 400 of FIG. 2 is an initial extraction target file. Further, according to the relevance information 410 in FIG. 4, since there is the File E related to the File D, the File E is extracted as the related file. In a case of a file to be deleted, since all related files related to the relation source file can be collectively deleted together with the related source file, calculation of the relevance may be omitted. However, if the related file is also the client request file or the pre-read file, the related file is not deleted as described above.

Further, the deletion target is limited to the actual file. As described above, a file that is a pre-reading target in the pre-reading list is excluded from the deletion targets. In this example, the extraction related file 706 of the pre-reading list 700 in FIG. 6 is referred to, and it can be determined that the File D and the File E are not the pre-reading targets in the extraction related file 804. Therefore, the File D and the File E are set as the deletion targets according to the deletion (virtualization) or pre-reading cancellation target 805.

Now, as in the example of FIG. 7, when the target deletion capacity is 100 MB, the free capacity of 100 MB can be secured in the storage device 140 by virtualizing the File D and the File E. Therefore, the File D and the File E are deleted from the storage device 140, and the File B and the File C are stored. If the target deletion capacity cannot be reached by deleting the File D and the File E, pre-reading of a file (the File C in the example of FIG. 6) having lower relevance in the pre-read files is canceled.

<12. Generation of Related Information>

Figure 11:
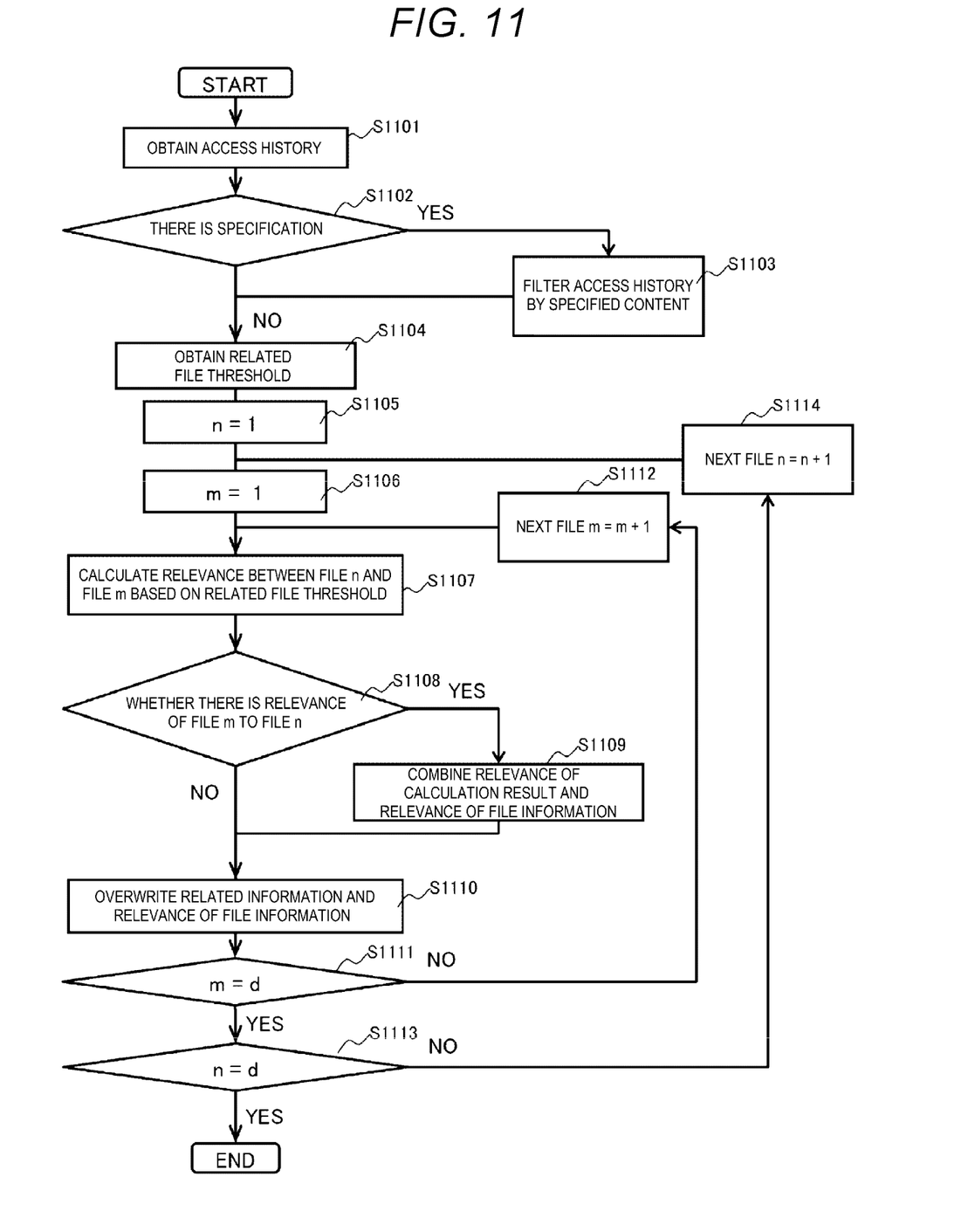
FIG. 11 is a flowchart example of processing of a relevance calculation module according to the embodiment.

FIG. 11 shows a flowchart example of processing in which the relevance calculation module 122 generates the relevance information 410. When the relevance information 410 is updated periodically or at any time, the processing is started.

The access history information 600 is obtained (S1101).

It is checked whether only a specific user or host is specified in the relevance information 410 to be generated (S1102). By this specification, it is possible to specify the user or host to which the data pre-reading and deletion of the embodiment is applied.

If only a specific user or host is specified, the access history information 600 is filtered by the specific user or host (S1103).

If no specification has been made or the access history information 600 has already been filtered, the related file threshold 504 or the function for calculating the relevance is obtained from the pre-reading setting information 500 (S1104).

In the following processing, relevance between an n-th file (relation source file) and an m-th file of the access history information 600 is sequentially calculated. A total number of files is set to d.

A number n of the relation source file is set to 1 (S1105). A number m of a file for calculating the relevance is set to 1 (S1106).

The relevance between the n-th file and the m-th file of the access history information 600 is calculated using the related file threshold 504 (or function) and the number of consecutive access times (access frequency) (S1107).

For example, when the number of accesses from the File 1 to the File 2 is 100 times and the number of accesses from the File 1 to the File 3 is 1, processing such as multiplying a relevance correction coefficient 100/101 from the File 1 to the File 2 and a relevance correction coefficient 1/101 from the File 1 to the File 3 is performed.

When n=m, the relevance is 100%, so that calculation in a condition of n=m may be omitted. Since the relevance depends on an order of access, relevance of the file m to the relation source file n and relevance of the file n to the relation source file m is generally different.

Next, it is checked whether the relevance of the file m to the file n in the file information has already been set (S1108). If the relevance has already been set, relevance of a calculation result and current relevance are combined (for example, an average value is obtained) (S1109). The relevance of the calculation result is stored (overwritten) in the relevance information 410 (S1110).

It is checked whether the relevance of all the files m to one specific relation source file n has been calculated (S1111). If the calculation has not been performed for all the files, a next file is specified (S1112). If the calculation has been performed for all the files, it is checked whether all the files have been set as the relation source file n (S1113).

If all the files have been set as the relation source file, the processing is completed. If not all the files have been set as the relation source file, a next file is specified as the relation source file (S1114).

As described above in detail, in one embodiment, the data obtained in the Edge node is not basically deleted, but when the client request data or the related data thereof is obtained from the Core node, a mechanism for deleting (virtualizing) the data is used when the capacity is insufficient. At this time, data to be deleted is also determined using the related information used for pre-reading. The capacity of the data to be deleted is the insufficient amount of the capacity. Accordingly, even if the pre-read data exceeds the predetermined access time, the data is not deleted beyond the insufficient amount of the capacity. Therefore, it is possible to perform optimal pre-reading in minimum data transmission and reception, and it is possible to reduce the load, reduce usage fee of the band, and speed up data obtaining of the client.

What is claimed is:

1. An information processing device, which includes a storage device, outputs client request data based on a request of a client, and stores predetermined pre-read data in the storage device before the request of the client, the information processing device comprising:

a relevance calculation module configured to calculate relevance between data based on an access history of the data; and a pre-reading and deletion module configured to determine data to be deleted from the storage device using the relevance when data having predetermined relevance with the client request data is to be stored to the storage device as the pre-read data and a storage capacity of the storage device is insufficient if at least one of the client request data and the pre-read data is to be stored to the storage device, wherein the relevance is defined by a monotonically decreasing function f(t) for a set of two pieces of data accessed with an access interval of time t.

2. The information processing device according to claim 1, wherein the pre-reading and deletion module is configured to extract low-access data based on the access history, extract data having predetermined relevance with the low-access data as low-access related data, and determine the low-access data and the low-access related data as the data to be deleted from the storage device.

3. The information processing device according to claim 2, wherein the low-access data is data with the lowest number of accesses or the oldest access time within a certain period based on the access history.

4. The information processing device according to claim 2, wherein when the low-access data or the low-access related data is also data scheduled to be stored to the storage device as the pre-read data, the low-access data and the low-access related data is excluded from the data to be deleted from the storage device.

5. The information processing device according to claim 1, wherein the pre-reading and deletion module is configured, when at least one piece of the pre-read data is stored to the storage device, to determine a capacity of the pre-read data based on pre-reading setting information that defines a bandwidth of a line from a host reading the pre-read data and a pre-read file obtaining time.

6. The information processing device according to claim 1, wherein the monotonically decreasing function f(t) is a linear function or a sigmoid function.

7. The information processing device according to claim 1, wherein when a set of specific first data and specific second data is accessed a plurality of times within a certain time, an average value of the relevance calculated for each access is defined as the relevance between the first data and the second data.

8. The information processing device according to claim 7, wherein when the set of the specific first data and the specific second data is accessed less than a predetermined number of times within the certain time, the relevance between the first data and the second data is not calculated or is invalid even if calculated.

9. The information processing device according to claim 1, wherein the relevance is calculated for each client, or for each host that reads the pre-read data, or for each combination of the client and the host.

10. A data management method of an information processing device, which provides client request data to a client based on a request of the client, the data management method comprising:
by using relevance between data calculated based on an access history of the data,
a first step of checking whether the client request data exists in a first storage device in response to the request of the client;
a second step of obtaining the client request data from a second storage device and storing the client request data to the first storage device when the client request data does not exist in the first storage device;
a third step of extracting pre-read data having predetermined relevance with the client request data in response to the request of the client;
a fourth step of obtaining the pre-read data from the second storage device and storing the pre-read data to the first storage device; and
a fifth step of determining data to be deleted from the first storage device using the relevance when a storage capacity of the first storage device is insufficient if at least one of the client request data and the pre-read data is to be stored to the first storage device,
wherein the relevance is defined by a monotonically decreasing function f(t) for a set of two pieces of data accessed with an access interval of time t.

11. The data management method of an information processing device according to claim 10,
wherein the fifth step includes:
a sixth step of specifying low-access data existing in the first storage device based on the access history of the data;
a seventh step of extracting low-access related data having predetermined relevance with the low-access data; and
an eighth step of deleting the low-access data and the low-access related data from the first storage device.

12. The data management method of an information processing device according to claim 11,
wherein in the third step, under a limitation of a pre-readable data capacity, data having high relevance with the client request data is extracted preferentially as the pre-read data,
wherein in the seventh step, all data having relevance with the low-access data is extracted as the low-access related data, and
wherein when the low-access data or the low-access related data is also extracted as the pre-read data in the third step, a priority is given to extraction of data as the pre-read data.

13. The data management method of an information processing device according to claim 12,
wherein the low-access data is data with the lowest number of accesses or the oldest access time within a certain period based on the access history.

* * * * *